United States Patent [19]

Kawada et al.

[11] Patent Number: 4,663,550
[45] Date of Patent: May 5, 1987

[54] SHAFT FOR AN ELECTRIC MOTOR WITH DC BRAKE

[75] Inventors: Shigeki Kawada, Hino; Yoichi Amemiya; Masatoyo Sogabe, both of Hachioji; Katsuya Sugahara, Hino, all of Japan

[73] Assignee: Fanuc LTD, Tokyo, Japan

[21] Appl. No.: 645,745

[22] PCT Filed: Dec. 27, 1983

[86] PCT No.: PCT/JP83/00455
§ 371 Date: Aug. 27, 1984
§ 102(e) Date: Aug. 27, 1984

[87] PCT Pub. No.: WO85/02952
PCT Pub. Date: Jul. 4, 1985

[51] Int. Cl.$^4$ .................. H02K 7/106; H02K 1/02
[52] U.S. Cl. ................................. 310/93; 310/256
[58] Field of Search ............... 29/598; 228/112, 113, 228/114; 310/75 R, 77, 90, 93, 171, 256; 403/271, 222

[56] References Cited

U.S. PATENT DOCUMENTS

| | | | |
|---|---|---|---|
| 3,037,133 | 5/1962 | Peach | 310/77 |
| 3,711,009 | 1/1973 | Kuzuya et al. | 228/112 |
| 4,491,753 | 1/1985 | Kumatani | 310/77 |

FOREIGN PATENT DOCUMENTS

| | | | |
|---|---|---|---|
| 162181 | 12/1976 | Japan | |
| 55-40680 | 3/1980 | Japan | |
| 163318 | 12/1980 | Japan | 310/75 R |

Primary Examiner—Patrick R. Salce
Assistant Examiner—D. L. Rebsch
Attorney, Agent, or Firm—Armstrong, Nikaido, Marmelstein & Kubovcik

[57] ABSTRACT

A motor with DC brake having a DC electromagnetic brake (10) arranged on the shaft (14) of the rotor (16) thereof, in which a partial shaft (14b) extending through and outward from the DC electromagnetic brake (10) is formed of a nonmagnetic metal material. A partial shaft (14a) extending through the rotor (16) is formed of a free cutting metal material, and partial shafts (14a) and (14b) are coaxially united to form the integral shaft (14) at a junction (18) by friction welding.

4 Claims, 3 Drawing Figures

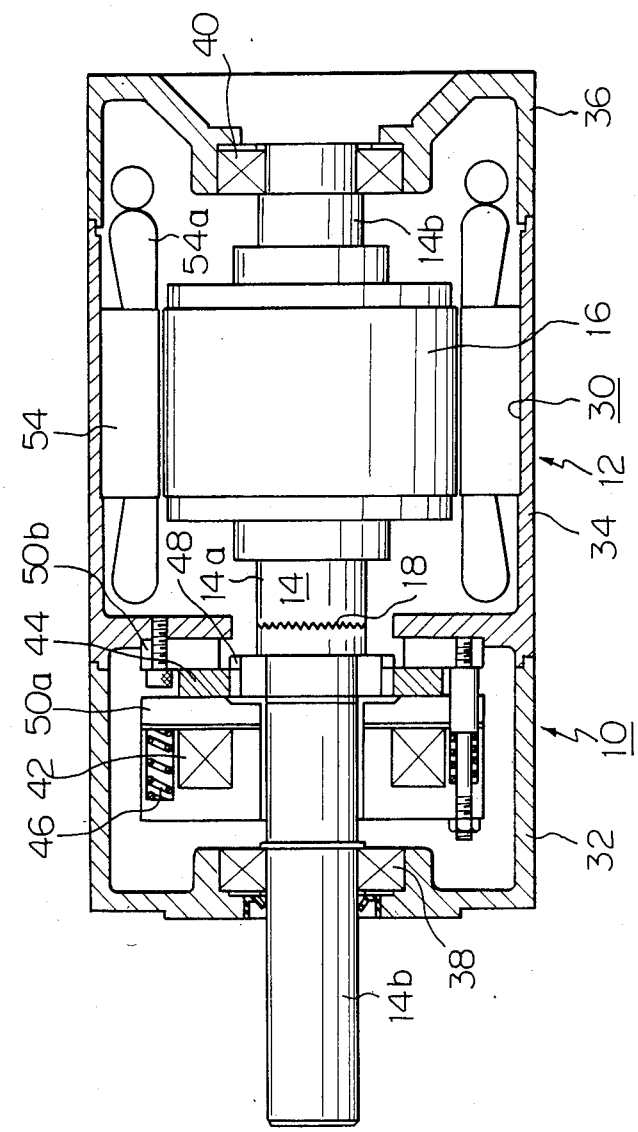

SHAFT FOR AN ELECTRIC MOTOR WITH DC BRAKE

TECHNICAL FIELD

The present invention relates to an electric motor with a DC brake having a brake mechanism which is disengaged upon being excited by a direct current, more particularly to an improvement of the shaft structure of the motor.

BACKGROUND ART

A motor with built-in brake having a brake mechanism associated with the rotor shaft has conventionally been used. The brake mechanism of a motor with a built-in brake is constituted so that the rotation of the rotor is braked by pressing a brake pad with a spring pressure against a brake disk secured to the rotor shaft. The rotor is released by disengaging the brake pad from the brake disk through the excitation of a DC electromagnet. Such a brake mechanism includes a brake disk, a brake pad, a braking spring or springs, and a DC electromagnet for disengaging the brake is disposed coaxially with the rotor within a case at the front end or at the rear end of the motor. In such a brake mechanism, the DC electromagnet is disposed near the rotor shaft. Therefore, a leakage flux flows as far as to the part of the rotor shaft extending outside the motor when the rotor shaft is formed of a material, such as a carbon steel, which is easily workable and has high mechanical strength and magnetic conductivity. Consequently, when such an electric motor with a DC brake is employed as the driving source of a machine tool, powder of magnetic materials, such as iron powder, adheres to the projecting part of the rotor shaft, adversely affecting the mechanical connection between the projecting part of the rotor shaft and the associated driven body. When a revolution detector is provided on the rotor shaft of the motor for the servocontrol of the motor, the leakage flux adversely affects the revolution detector by causing errors in detecting revolutions and deteriorating the detecting accuracy. Accordingly, in some cases, a rotor shaft of a nonmagnetic material, such as a stainless steel, is employed in an electric motor with a DC brake. However, nonmagnetic materials, including stainless steels, in general are hard to work. It is difficult and costly to work such a material to form a rotor shaft. In addition, nonmagnetic materials are comparatively expensive.

DISCLOSURE OF THE INVENTION

Accordingly, it is an object of the present invention to provide an electric motor with a DC brake eliminating the above-mentioned disadvantages, having a rotor shaft formed of two parts, namely, a part formed of a nonmagnetic material and a part formed of a free cutting metal, joined together by a recently developed pressure welding method.

According to the present invention, there is provided an electric motor with a DC brake equipped on the rotor shaft thereof with a brake mechanism adapted to be disengaged when excited by DC current, in which part of the rotor shaft extending through and outward from the brake mechanism is formed of a nonmagnetic material and the other part, i.e., the part extending within the rotor, is formed of a free cutting metal material and both the parts of the rotor shaft are connected coaxially and integrally. The free cutting metal material applicable to the rotor shaft is a machine structural carbon steel or a chromium-molybdenum steel, and the nonmagnetic material is a stainless steel.

BRIEF DESCRIPTION OF THE DRAWINGS

FIG. 2 is a sectional view of an electric motor with a DC brake embodying the present invention, showing the constitution of the same.

BEST MODE FOR CARRYING OUT THE INVENTION

Figure 1:
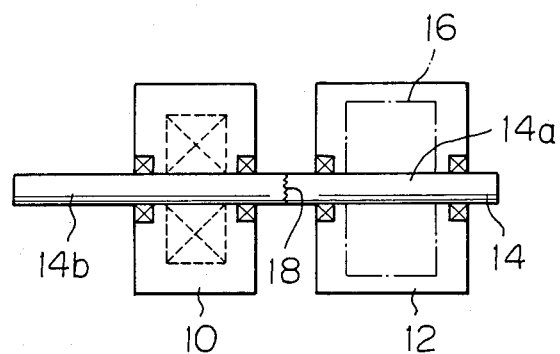
FIG. 1 is a schematic diagram of an electric motor with a DC brake, embodying the present invention, showing the general constitution of the same.

FIG. 1 shows the general constitution of a preferred embodiment of an electric motor with a DC brake of the present invention equipped with a DC electromagnetic brake disposed in the front part of the motor. Referring to FIG. 1, a DC electromagnetic brake 10 and a electric motor 12 have a common shaft 14. The rotor 16 of the motor 12 is mounted on a partial shaft 14a and the DC electromagnetic brake 10 is mounted on a partial shaft 14b. The partial shaft 14a is formed of a free cutting metal material while the partial shaft 14b is formed of a nonmagnetic material. The partial shafts 14a and 14b are connected together by the upsetting friction welding method. Therefore, the mechanical strength of the joint 18 is very high and partial shafts 14a and 14b are united perfectly. In the friction welding process, a free cutting metal rod and a nonmagnetic metal, each of a preselected diameter, are friction-welded axially, and then the rod thus welded is subjected to machining according to the design specifications of the motor. Generally, since the length of the partial shaft 14a for the rotor 16 is greater than the length of the partial shaft 14b for the DC electromagnetic brake 10, and hence the major part of the shaft 14 is formed of a free cutting metal material, the shaft machining efficiency is improved. Furthermore, since the partial shaft 14b is formed of a nonmagnetic material and, therefore, the magnetic permeability of the same is small, the leakage flux leaking from the DC electromagnetic brake is not conducted outside through the partial shaft 14b. Accordingly, a disadvantage of the conventional motor with a DC brake that powder of magnetic materials adheres to a part of the rotor shaft extending frontward from the brake and being connected to a driven device, for example the feed shaft of a machine tool, is eliminated completely. In case the material forming the partial shaft 14a is a machine structural carbon steel and the nonmagnetic material forming the partial shaft 14b is a stainless steel, the use of the expensive stainless steel is reduced to the least possible quantity. Such a structure of the rotor shaft contributes greatly to the reduction of the cost of the motor.

FIG. 2 is a sectional view of a motor with a DC brake as described hereinbefore embodying the present invention. In this embodiment, a DC electromagnetic brake 10 and a motor 12 are arranged along a longitudinal axis in a single unit housed in a housing 30 consisting of a front housing 32, a central housing 34 and a rear housing 36. The front housing 32 contains the DC electromagnetic brake 10 and supports a front bearing 38. The central housing 34 contains the motor 12. The rear housing 36 supports a rear bearing 40 coaxially with the front bearing 38. The rotor shaft described in connection with FIG. 1, consisting of the partial shaft 14a for the rotor and the partial shaft 14b of a nonmagnetic material penetrating through the DC electromagnetic brake 10 is supported rotatably in the front and the rear bearings 38 and 40. The partial shafts 14a and 14b are united coaxially at a joint 18 by upsetting friction welding as mentioned earlier. The DC electromagnetic brake 10 includes a DC electromagnet 42, a brake disk 44, a braking spring assembly 46, an external spline 48 axially slidably supporting the brake disk 44, a movable brake pad 50a, and a fixed brake pad 50b. The DC electromagnet 42 is fixed to the fixed brake pad 50b and the fixed brake pad 50b is fixed to the central housing 34 by means of supporting bolts, respectively.

On the other hand, the motor 12 has a stator 54 fixed to the central housing 34 and a rotor core 56 secured to the partial shaft 14a. Windings 54a are mounted on the stator 54. When the windings 54a are energized, a torque is generated in the rotor 16 formed of the partial shaft 14a and the rotor core 56.

In the motor with a DC brake of the above-mentioned construction embodying the present invention, since no appreciable magnetic flux flows into the partial shaft 14b even when the DC electromagnet 42 of the DC electromagnetic brake 10 is energized, part of the rotor shaft 14 extending frontward from the front housing 32 is not magnetized. Accordingly, the connective capability of the projecting part of the rotor shaft 14 is not subject to deterioration when used as a part for mechanically connecting the motor to a driven body, not shown.

Figure 3:
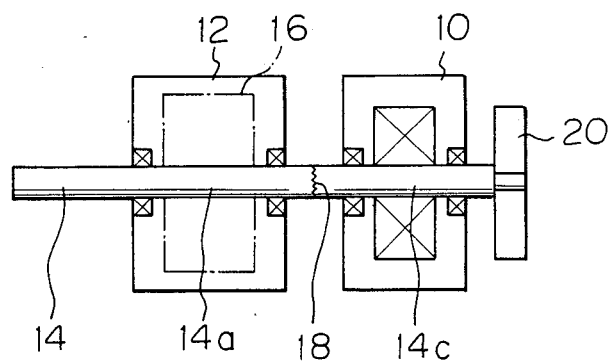
FIG. 3 is a schematic diagram of another electric motor with a DC brake embodying the present invention, showing the general constitution of the same.

FIG. 3 shows the constitution of another embodiment of the present invention, in which an electric motor is provided with a DC electromagnetic brake on the rear side thereof, and a tachometer for detecting the output revolving rate of the motor, for example, an encoder, is attached to the rear end of the motor.

In this embodiment, the partial shaft 14a of the rotor 16 of the motor 12 is formed, similarly to that of the above-mentioned embodiment, of a free cutting metal material while the partial shaft 14c of the DC electromagnetic brake 10 disposed behind the partial shaft 14a is formed of a nonmagnetic material. Both partial shafts 14a and 14c are united to form an integral shaft 14 by the friction welding method at the junction 18. Since a tachometer 20 is attached to the rear end of the nonmagnetic partial shaft 14c, the leakage flux of the magnetic force of the DC electromagnetic brake 10 does not flow through the partial shaft 14c, and thereby the tachometer 20 is never exposed to the adverse effect of the leakage flux. Naturally, the second embodiment has the same advantages as those of the first embodiment.

We claim:
1. A motor and brake apparatus comprising:
    (a) an electric motor;
    (b) a DC electromagnetic brake;
    (c) a power shaft extending through said motor and said brake and on which said motor and brake are mounted and projecting outwardly from said brake;
    (d) said shaft having a first portion of magnetic free-cutting metal extending through said motor and a second portion of non-magnetic metal extending through said brake and projecting outwardly therefrom for connecting the motor mechanically to a driven body, and said first and second shaft portions being united at a position axially to form an integral power shaft.

2. An electric motor with a DC brake according to claim 1, wherein said partial shaft of the DC electromagnetic brake and said partial shaft of the rotor are united to form the integral rotor shaft by friction welding.

3. An electric motor with a DC brake according to claim 2, wherein said partial shaft of the DC electromagnetic brake is formed of a stainless steel.

4. An electric motor with a DC brake according to claim 1, wherein outward projecting part of the partial shaft of the DC electromagnetic brake forms a part for supporting a revolution detector.

* * * * *